(12) United States Patent
Cudahy

(10) Patent No.: US 10,479,942 B1
(45) Date of Patent: Nov. 19, 2019

(54) CONTINUOUS HIGH CAPACITY SYSTEM FOR BIOMATTER CONVERSION

(71) Applicant: George Francis Cudahy, Anthony, NM (US)

(72) Inventor: George Francis Cudahy, Anthony, NM (US)

(*) Notice: Subject to any disclaimer, the term of this patent is extended or adjusted under 35 U.S.C. 154(b) by 0 days.

(21) Appl. No.: 16/506,362

(22) Filed: Jul. 9, 2019

Related U.S. Application Data

(60) Provisional application No. 62/697,221, filed on Jul. 12, 2018.

(51) Int. Cl.
| | | |
|---|---|---|
| *C10G 1/00* | (2006.01) | |
| *F25J 1/00* | (2006.01) | |
| *B01J 19/20* | (2006.01) | |
| *B01J 19/00* | (2006.01) | |

(52) U.S. Cl.
CPC .......... *C10G 1/008* (2013.01); *B01J 19/0013* (2013.01); *B01J 19/20* (2013.01); *F25J 1/0022* (2013.01); *F25J 1/0045* (2013.01); *B01J 2219/00051* (2013.01); *B01J 2219/00162* (2013.01); *B01J 2219/00202* (2013.01); *B01J 2219/00225* (2013.01); *C10G 2300/1003* (2013.01); *C10G 2300/4006* (2013.01); *C10G 2300/4012* (2013.01); *F25J 2205/84* (2013.01); *F25J 2210/66* (2013.01)

(58) Field of Classification Search
CPC ............ C10G 1/008; C10G 2300/4012; C10G 2300/1003; C10G 2300/4006; B01J 19/20; B01J 19/0013; B01J 2219/00162; B01J 2219/00225; B01J 2219/00202; B01J 2219/0005; F25J 1/0022; F25J 1/0045; F25J 2205/84; F25J 2210/66
See application file for complete search history.

(56) References Cited

U.S. PATENT DOCUMENTS

| | | | |
|---|---|---|---|
| 9,005,537 B1* | 4/2015 | Cudahy | B01J 19/004 422/187 |
| 2018/0100108 A1* | 4/2018 | Grainger | C10L 3/101 |

* cited by examiner

*Primary Examiner* — Randy Boyer
*Assistant Examiner* — Juan C Valencia
(74) *Attorney, Agent, or Firm* — Nolte Intellectual Property Law Group

(57) ABSTRACT

A continuous high capacity system for converting hydrocarbon-containing post-consumer waste, post-industrial waste, and/or renewable hydrocarbon feedstock into biofuels having an extruder for agglomerating particles and pressurizing them, a shredder to shred the agglomerated particles, a heating system to rapidly heat the fine particulate, a separator that receives heated solids and prevents heated vapors from leaving the system, and a filter with solids separator that receives the heated vapor and further separates microfine solids from the heated vapor forming a substantially cleaned vapor. A vapor cooling system receives the substantially cleaned vapor and using controlled pressure and controlled temperature, cools the substantially cleaned vapor to at least one hydrocarbon liquid and a gas, forming a hydrocarbon liquid for transfer to another device and/or using the gas as a fuel.

18 Claims, 9 Drawing Sheets

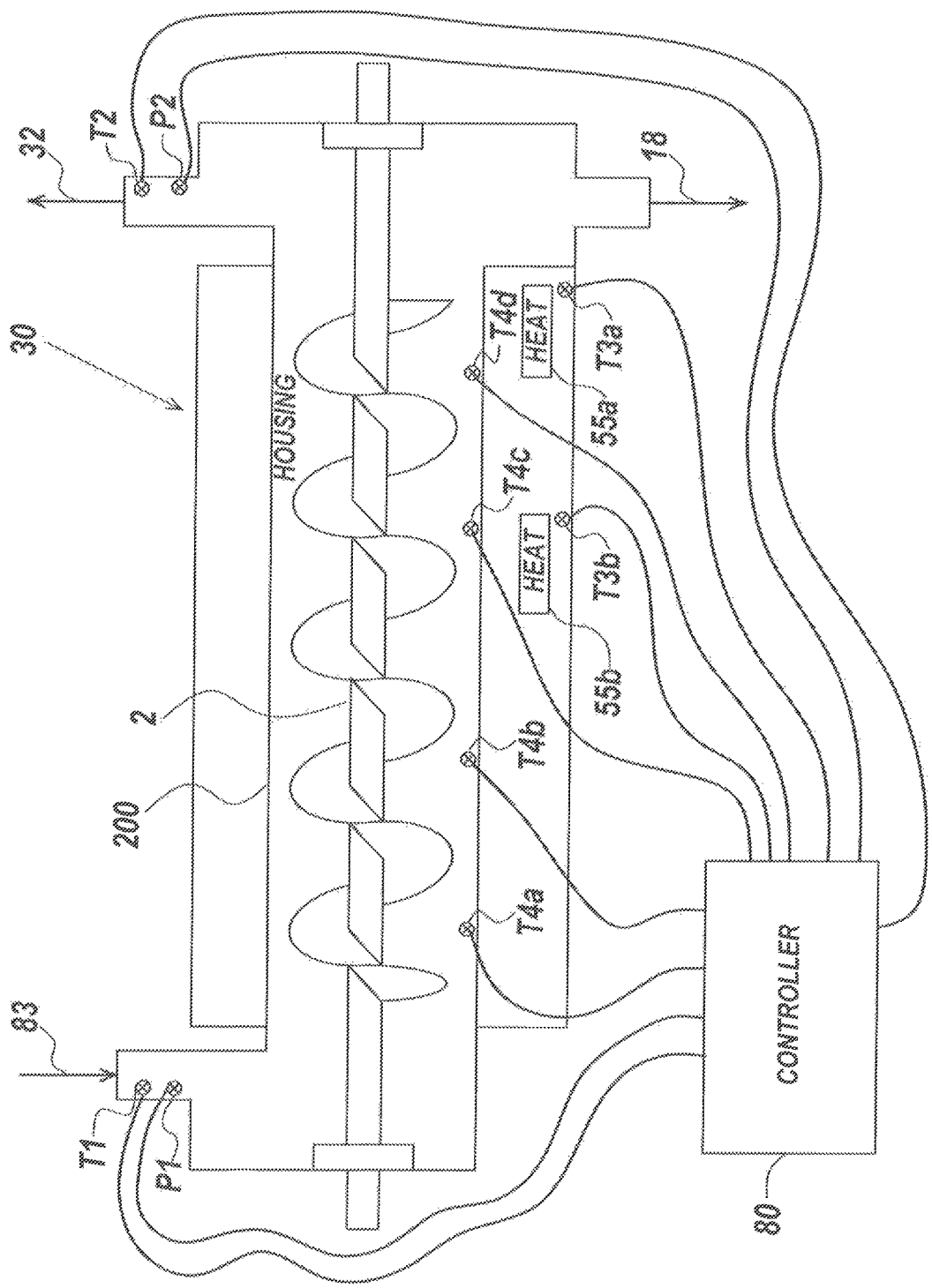

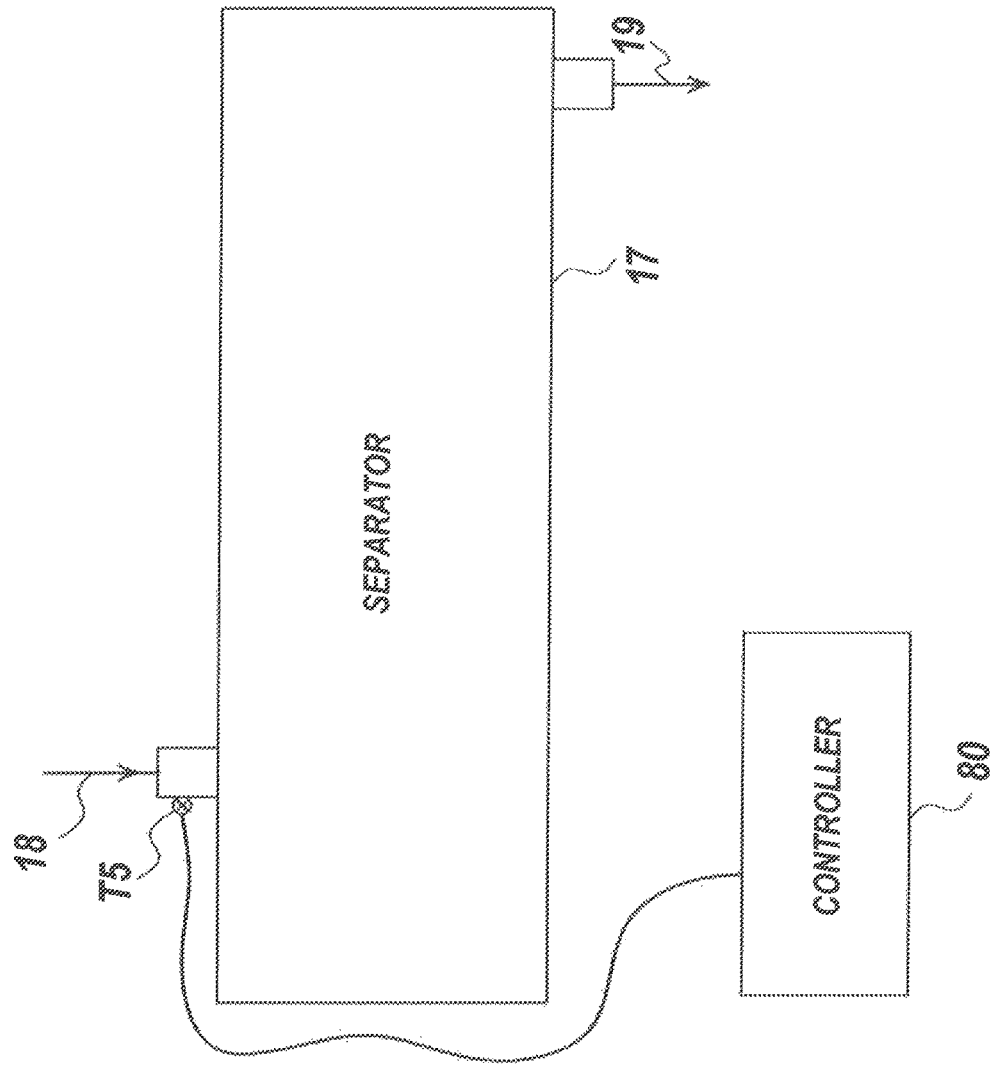

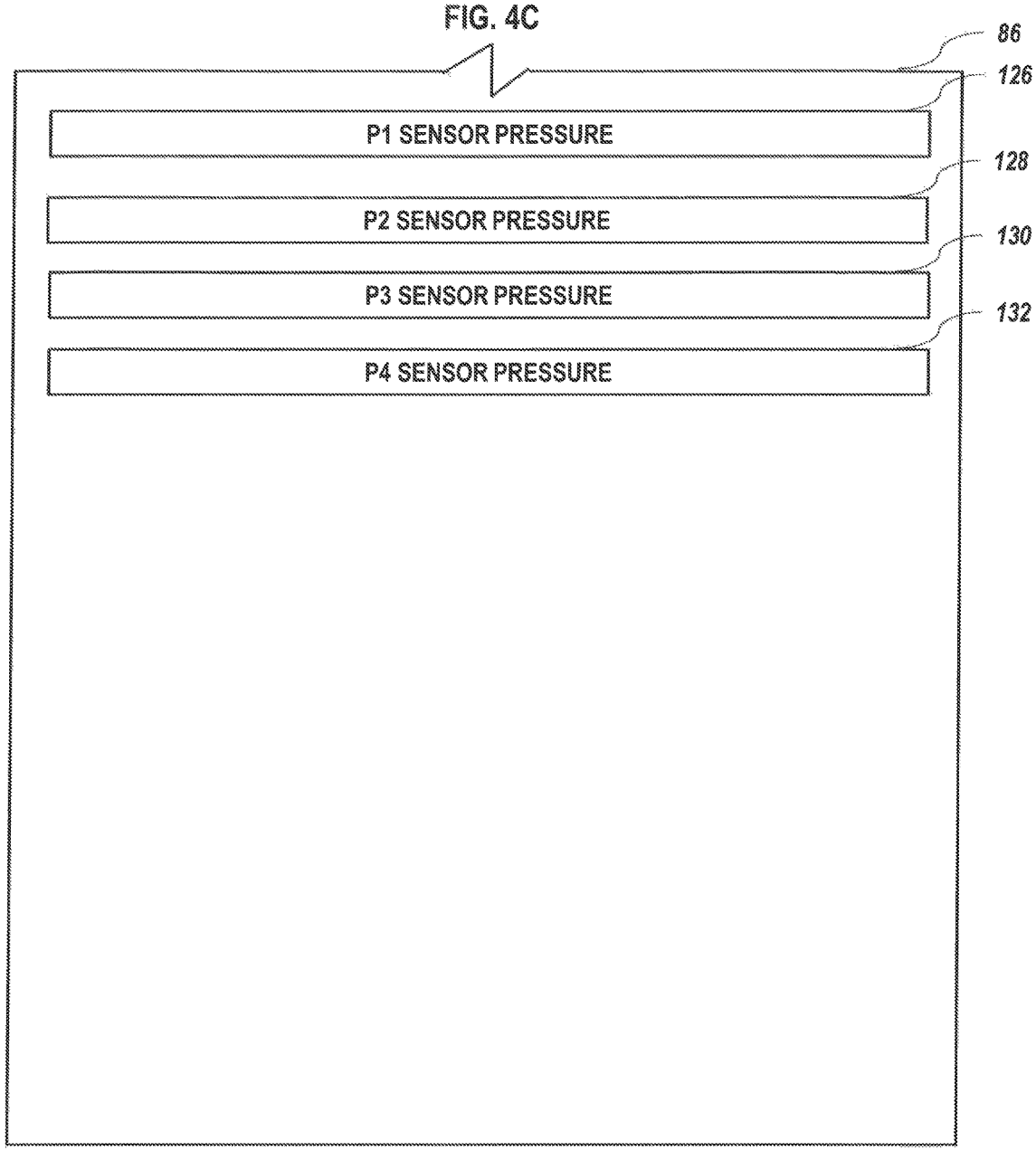

CONTINUOUS HIGH CAPACITY SYSTEM FOR BIOMATTER CONVERSION

CROSS REFERENCE TO RELATED APPLICATION

The present application claims priority to and the benefit of U.S. Provisional Patent Application Ser. No. 62/697,221, filed on Jul. 12, 2018, and titled "CONTINUOUS HIGH CAPACITY SYSTEM FOR CONVERTING HYDROCARBON CONTAINING POST-CONSUMER WASTE, POST-INDUSTRIAL WASTE, AND RENEWABLE HYDROCARBON FEEDSTOCK INTO BIOFUELS." This reference is hereby incorporated in its entirety.

FIELD

The present disclosure generally relates to a continuous flow, high capacity system for converting biomatter, such as hydrocarbon-containing post-consumer and/or post-industrial waste and renewable feedstocks, into bioproducts such as biofuels.

BACKGROUND

A need exists to reduce hydrocarbon waste in landfills.

A further need exists to use hydrocarbon waste and renewable hydrocarbon feedstocks to create a fuel usable in transportation vehicles and for other energy requirements.

The present embodiments may meet these needs.

BRIEF DESCRIPTION OF THE DRAWINGS

The detailed description will be better understood in conjunction with the accompanying drawings as follows:

FIGS. 3A-D show a plurality of temperature sensors and pressure sensors installed on components of the system.

FIG. 4A-C depicts a diagram of a controller usable in the system.

Figure 1:
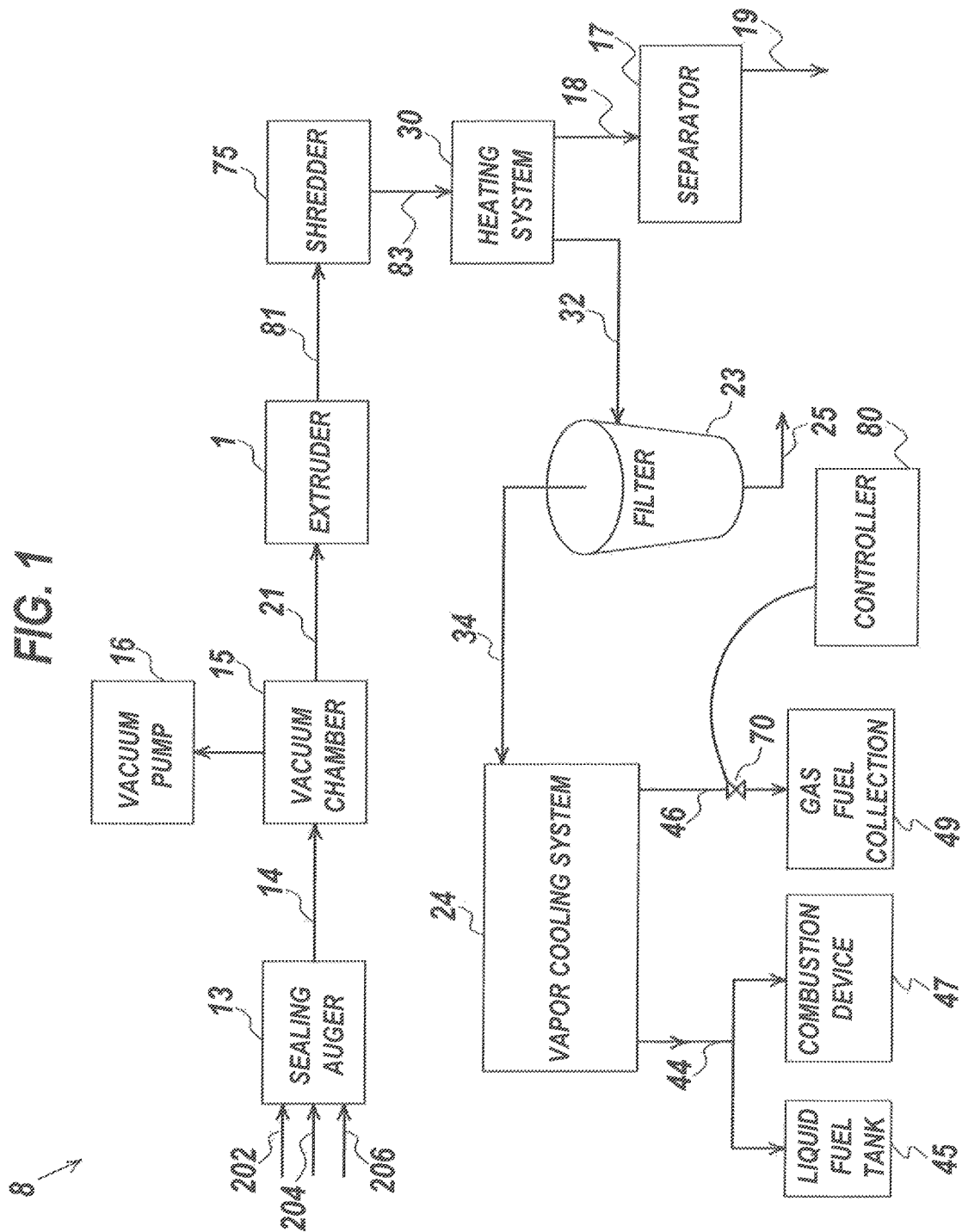
FIG. 1 depicts a diagram of a continuous high capacity system for converting hydrocarbon-containing post-consumer waste, post-industrial waste, and/or renewable hydrocarbon feedstock.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a continuous flow, high capacity system for rapidly converting hydrocarbon-containing post-consumer and post-industrial waste and/or renewable feedstocks into biofuels.

Implementation of this invention may transform biomass such as wastepaper; cardboard; plastics; rubber; sewage treatment solid waste; animal manure; switch grass; and other solid hydrocarbons into liquid fuels.

The implementation of this invention nationwide may eliminate or reduce landfills and the landfill potential to leak the greenhouse gas methane into the atmosphere and potential to leak contaminants into the water table below the landfill site.

In addition, implementation of this invention nationwide could provide approximately five percent of the nation's total energy requirement from renewable energy sources. There is sufficient biomass waste generated on a daily basis to produce the cited amount of renewable energy. This level of production could contribute to attaining the goal of energy independence and reduction of the potential for foreign energy suppliers to disrupt the economy of the United States.

Implementation of this invention may significantly reduce the amount of carbon dioxide emitted into the atmosphere.

Distribution of the implementation of this invention throughout the United States in order to process the biomass waste generated throughout the United States could greatly reduce the necessity of transporting liquid fuels from the liquid fuel sources to the refineries and from the refineries to the market. The liquid fuels produced with this invention could already be distributed, with the location of the fuel production closely matching the greatest market needs since the greatest market needs are where the greatest biomass waste is generated.

Since energy is required to raise the temperature of the biomass in order to transform the biomass into a gas in this process, any of the biomass gas not converted into a liquid in the biomass gas condensing process could be used to provide a significant portion of the energy input required in the process. Any biomass not converted to a gas in the solid to gas transforming part of this invention may be captured and recycled through the process or sequestered in soil as a soil enhancer in the form of char.

Feed materials such as consumer waste, industrial waste, cow manure, paper, cardboard, wood, plastic, tires, switch grass, farm residue, and any type of materials containing both organic and inorganic materials are finely ground, then passed into a vacuum chamber via a sealing auger and then into an extruder. The sealing auger and the extruder agglomerate and pressurize the finely ground materials so as to prevent or reduce ambient air leakage into the vacuum chamber via the sealing auger and prevent or reduce leakage of the heating system gases into the vacuum chamber via the extruder. The extruder also allows pressures in the heating system to pressures greater than local atmospheric pressure.

In some embodiments, a vacuum chamber and vacuum pump are not utilized. Instead, the feed materials may be directed to the extruder under atmospheric conditions. In such embodiments, a sealing auger also might not be utilized. It is to be understood that embodiments that include a vacuum chamber and/or sealing auger as well as embodiments that do not include a vacuum chamber and/or sealing auger fall within the scope of the present disclosure.

Extruded feed material may be passed through a shredder in order to reduce the extruded feed material to smaller pieces as the material enters the heating system. The feed material is then rapidly heated to a temperature sufficient to form gases of most (during the heating process some of the organic material may form "char" which is carbon—and char is a solid) of the organic materials.

The organic materials and inorganic materials plus char (solids) are passed along the heating system, the organic materials as gases are evolved, the solids as fine particles via various renditions of a screw conveyor.

The outer and/or inner housing(s) of the screw conveyor serving as the surface(s) of a heat exchanger in the event of indirect heating. The indirect heating being electric heaters, air-fuel burners, oxygen-fuel burners, or any other method to apply heat to the indirect heating heat exchanger.

The material may be heated directly with internal heating while inside the heating system wherein the heat is added directly to the materials to be separated. The internal heating being electric heaters, oxygen-fuel burners, air-fuel burners, burning some of the material being processed with oxygen, an electric arc heater, and/or any other method of directly heating the material to be separated. A combination of indirect heating and direct heating may also be employed.

The organic gases travel along the screw conveyor housing to a gas exhaust port located at or near the discharge end of the screw conveyor wherein the gases then enter a cooling system via a cyclone, the cooling system reduces the organic gases to liquids and gases.

The solids are carried along the screw conveyor to the solids discharge port and enter a solids discharge system such as a rotary gas lock or other sealing type devices which allow most of the solids to exit the screw conveyor while preventing or restraining all or almost all of the organic gases from exiting via the solids exhaust system.

The gas discharge port and the solids discharge port may be located along the screw conveyor discharge end separated from each other or in close proximity to each other.

Other gas-lock systems other than a rotary gas lock system may be used to achieve the same screw conveyor exhaust organic gases and solids separation. The solids are carried away from the solids exhaust via belt conveyor, screw conveyor, or other conveying methods.

The cooling system can range in surface area in an embodiment to allow sufficient temperature variations along the cooling chamber for a given desired flow rate in order to separate the liquid fuels according to their particular condensing temperatures.

The cooling chamber can range in surface area based on the preset temperatures desired by the user. A larger cooling surface area cooling chamber can allow up to 100 tons per hour of hydrocarbon material to be processed, a smaller cooling surface area cooling chamber can only allow 1 ton of hydrocarbon material to be produced.

Upon extrusion into the heating system, the heating system can directly heat the particles to change the hydrocarbons in the hydrocarbon materials into a gas or almost all into a gas. In another embodiment, a heating system can indirectly heat the particles to change the hydrocarbons in the hydrocarbon materials into a gas or almost all into a gas. The particles can be heated directly by introduction of an oxidizing agent into the heating chamber thus oxidizing some of the carbon and/or hydrogen contained in the material to cause the particles to be rapidly heated, causing transformation of all or almost all of the particles into a gas. Other type heaters, such as electric heaters, may also be used to heat the particles.

The heating system in maintained at the desired temperature to which the hydrocarbon material is to be subjected so that the material is quickly raised to the desired temperature in the heating chamber.

Any liquids or solids not converted into a gaseous state in the heating system are collected at the bottom of the exit of the heating system or bottom of the entrance to the cooling system, or in between.

In order to change the gaseous hydrocarbon to a liquid state, or combination of liquid and gas, the gaseous hydrocarbon produced by the heating system is next introduced into a cooling system whereby the gaseous hydrocarbon is changed, via temperature regulation, or temperature and pressure regulation, to various liquids or gaseous biofuels and hydrocarbons. The pressure in the heating system, the cyclone, the solids separator, and the cooling system is maintained by regulating the gas exhaust area of the cooling system.

Additional hydrogen can be introduced into the heating system to increase the amount of hydrogen contained in the fuel/hydrocarbon to be produced by injecting high hydrogen products, such as methane, liquid water, or steam at or above the heating system pressure in the amount required to produce the desired hydrocarbon products. If water, either gaseous or liquid, is used to supply additional hydrogen to the evolved gasses, the oxygen in the water will react with some of the carbon in the evolved gasses thus reducing the amount of carbon available in the evolved gasses to produce the desired product.

Water, oils or high hydrogen to carbon ratio liquids or a combination thereof can be premixed with the hydrocarbon material to help change the hydrocarbon material to the desired plasticity for extruding and sealing while also enhancing the amount of hydrogen in the final product.

In order to facilitate the addition of high hydrogen gasses, such as natural gas, as the hydrocarbon material enters the heating system, a gas manifold can be attached to the exit of the extruder and entrance to the heating system such that the high hydrogen gas and the extruded hydrocarbon material enter the heating system together and thus react together as they proceed along the heating system while increasing in temperature in the heating system.

The heating system and cooling system can operate at pressures other than the ambient pressure external to the heating and cooling chambers since the extruding auger used to extrude the hydrocarbon material into the heating system is capable of producing extruder exhaust pressures at pressures well above the ambient pressure, whatever pressure in the heating system is desired. The pressures above ambient in the heating system, the cyclone, the solids separator, and cooling system is regulated by regulating the gas exhaust area of the cooling system.

Pressures in the heating system and the cooling system can be controlled by regulating the release of the remaining gasses in the cooling system.

In embodiments, the controller can communicate with the network for monitoring from a remote location, and the controller can be a computer, a laptop, a cellular or mobile phone, a tablet, a meter, or similar device.

In embodiments, the network can be a cellular network, a satellite network, the internet, a local area network, a wide area network, separate meters, a similar network, or combinations thereof.

In embodiments, the system can continuously produce biofuel from up to 100 tons an hour of the hydrocarbon-containing material per extruder.

The hydrocarbon-containing post-consumer waste, post-industrial waste, and/or renewable feedstocks can be paper, cardboard, wood, rubber, plastics, manure, sewage solids, switch grass, garbage, grass, and other hydrocarbon and carbon-containing materials.

External heat can be applied to the heating system screw conveyor outer housing or inner housing by one or more heating system ducts surrounding the screw conveyor outer housing and/or within a shaftless screw conveyor inner housing, the duct(s) supplying high temperature gasses or liquids to the exterior of the screw conveyor outer housing. The entrance of the heating system duct(s) for the high temperature gasses or liquids comprises input duct port(s) and exhaust duct port(s) to exhaust the high temperature gasses or fluids from the heating system duct(s). External heat may also be applied to the materials inside a screw conveyor by applying external heat to the inside of a hollow screw conveyor shaft.

The heating of the continuous stream of agglomerated fine particulate 81 can be by direct or indirect heating.

In one or more embodiments, usable extruders can be a singled shaft or multiple shaft extruders.

The following terms are used herein:

The term "a substantially cleaned vapor" refers to a mixture of gas and liquid which contains by weight between 0.01 and 10% microfine solids based on the total weight of the substantially cleaned vapor.

The term "a rotating shaft" for a screw conveyor can denote a hollow shaft or a solid shaft.

The term "microfines" or "microfine solids" are defined as solid particles of less than approximately 50 microns in diameter.

The term "approximately" is used to convey that in processes and operations of the kind described herein, operating tolerances and variations from the norm may be experienced as a result of difficulties in control, timing, and setting various parameters of the process and/or operation. Thus, the term "approximately" denotes "within acceptable operating tolerances and parameters in light of the process and/or operation described and/or claimed."

Turning now to the Figures, FIG. 1 is a diagram of an overall system for a continuous high capacity system for converting hydrocarbon-containing post-consumer waste, post-industrial waste, renewable hydrocarbon feedstock and/or combinations thereof, into at least one biofuel, such as biodiesel, or other bioproducts.

The continuous high capacity system 8 has a sealing auger 13 fluidly connected to a vacuum chamber 15.

In embodiments, a vacuum pump 16 is fluidly connected to the vacuum chamber.

The vacuum chamber 15 is fluidly connected to the sealing auger 13 and the vacuum pump 16 removes air from the blended stream 14 forming a de-aerated blended stream 21.

The sealing auger 13 receives finely ground post-consumer waste 202, post-industrial waste 204, and/or renewable hydrocarbon feedstock 206 forming a blended stream 14.

The sealing auger prevents or inhibits leakage of ambient air into the continuous high capacity system.

The vacuum chamber is fluidly connected to an extruder 1, which is fluidly connected to a shredder 75.

The extruder 1 extrudes and pressurizes the de-aerated blended stream 21 containing post-consumer waste, post-industrial waste, and/or renewable hydrocarbon feedstock to a pressure of up to approximately 500 psi, agglomerating the de-aerated blended stream 21 into a continuous stream of agglomerated fine particulate 81.

The agglomeration and pressurizing of the de-aerated blended stream 21 may reduce and/or prevent leakage of gases back to the extruder entrance.

The extruder 1 conducts the agglomerated fine particles 81 in a continuous stream to the shredder 75.

A heating system 30 is fluidly connected to the extruder 1 and is configured to evolve a heated vapor 32 and heated solids 18.

The heating system can heat shredded particulate 83 to a temperature of approximately 500 to approximately 1500 degrees Fahrenheit, thereby forming heated vapors 32 and heated solids 18.

In embodiments, a separator 17 receives the heated solids 18 from the heating system 30.

The separator 17 (i) receives the heated solids 18 and (ii) prevents or restricts the heated vapors 32 from leaving the heating system via the separator 17. Separated solids 19 are flowed from the separator 17.

A filter 23 fluidly connected to the heating system 30 receives the heated vapors 32 and separates microfine solids 25 from the heated vapors 32 forming a substantially cleaned vapor 34.

A vapor cooling system 24 fluidly connects to the filter 23.

The vapor cooling system 24 receives the substantially cleaned vapor 34 and using pressure and temperature, cools the substantially cleaned vapor to a hydrocarbon liquid 44 and a gas 46.

The vapor cooling system 24 liquefies at least 50 percent of the substantially cleaned vapor 34 for transfer to a liquid fuel tank 45 or a combustion device 47 for use as fuel.

A pressure regulator valve 70 fluidly connects to an output from the vapor cooling system.

The pressure regulator valve controls pressure throughout the continuous high capacity system. The pressure regulator valve is depicted electronically connected to the controller 80.

The gas 46 is conveyed to a gas fuel collection 49.

Figure 2:
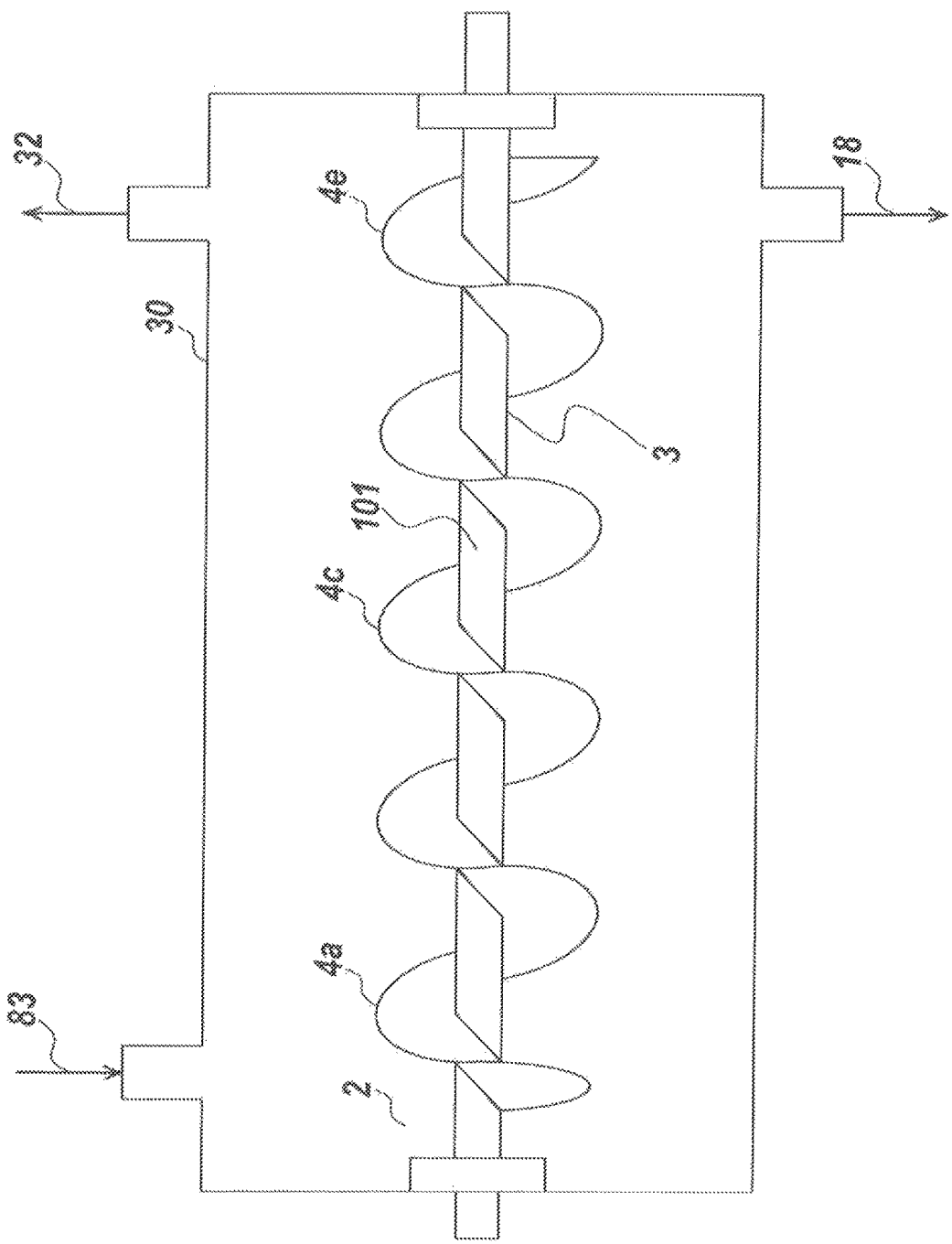
FIG. 2 shows a heating system as a screw conveyor with rotating shaft and flights.

FIG. 2 shows an embodiment of the heating system 30 using a screw conveyor 2 having a rotating shaft 3 with a plurality of screw conveyor flights 4a-4e installed on the rotating shaft 3.

In this embodiment, the rotating shaft 3 has a hollow core which can additionally be used to heat particulates by passing hot liquid and/or hot gas through the hollow core. Alternatively, the screw conveyor can be heated by passing hot liquid and/or hot gas through the hollow core and outside the housing. In other embodiments, the rotating shaft can be solid and the screw conveyor can be heated from outside sources, such as burners that electronically connect to the controller 80.

In this embodiment, the heating system 30 rapidly heats shredded particulate 83 to a temperature of approximately 500 to approximately 1500 degrees Fahrenheit, thereby forming heated vapors 32 and heated solids 18. In other embodiments, no shredder is needed and the heating system heats the continuous stream of agglomerated fine particulate 81.

FIGS. 3A-3D show a plurality of temperature sensors and pressure sensors installed on components of the system.

A temperature sensor T1 is mounted at an inlet of the heating system 30 to detect temperatures of the shredded particulate 83 from the shredder or, in other embodiments, the temperature of a continuous stream of agglomerated fine particulate as the particles enter the heating system 30. This temperature sensor communicates with a controller 80 in a wired or wireless communication. The temperatures sensed are stored as T1 temps in the computer readable memory of the controller 80.

The heating system 30 rapidly heats the agglomerated fine particulate to a temperature of approximately 500 to approximately 1500 degrees Fahrenheit.

A first pressure sensor P1 sensing vapor pressure at an input of the heating system 30 is used.

A second pressure sensor P2 sensing vapor pressure at an output of the heating system 30 is used.

Each pressure sensor is electronically connected to a controller 80.

A temperature sensor T2 is used to detect temperature outlet temperature of the heating system 30.

A plurality of third temperature sensors T3a and T3b for detecting external heat source temperatures from external heat sources 55a and 55b are used.

A plurality of fourth temperature sensors T4a-T4d for detecting temperature of a screw conveyor housing 200 are used.

Each of these temperature sensors electronically connects to the controller 80.

The temperatures sensed by temperature sensor T2 are stored as T2 temps in the computer readable memory of the controller 80.

The temperatures sensed by temperature sensors T3a and T3b are stored as T3 temps in the computer readable memory of the controller 80.

The temperatures sensed by temperature sensors T4a-T4d are stored as T4 temps in the computer readable memory of the controller 80.

In embodiments, the screw conveyor 2 has a hollow shaft to which a plurality of conveyor flights are connected.

The hollow shaft is heated via various means as the conveyor housing is heated for indirect heating of at least one temperature sensor detects the hollow shaft input temperature(s) and at least one temperature sensor detects the hollow shaft output temperature(s).

FIG. 3B depicts a temperature sensor T5, which detects temperatures of the heated solids 18 as the heated solids 18 enter the separator 17. The temperature sensor T5 is electronically connected to the controller 80.

Figure 3C:
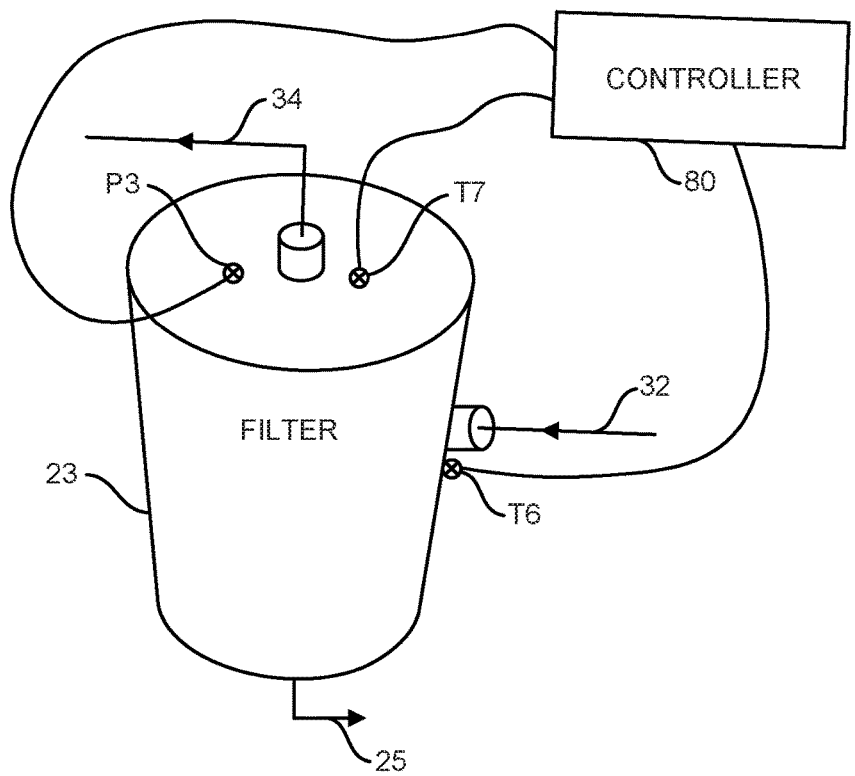

FIG. 3C depicts a sixth temperature sensor T6 used to detect temperature of heated vapors 32 as they enter the filter.

In an embodiment, the filter can be a cyclone.

The temperature sensor T6 is electronically connected to the controller 80.

A temperature sensor T7 shown in FIG. 3C is used to detect temperature of substantially cleaned vapor 34 in the filter, such as a cyclone. The temperature sensor T7 is electronically connected to the controller.

A third pressure sensor P3 is depicted for detecting pressure of heated vapor 32 in the filter such as a cyclone. The third pressure sensor is electronically connected to the controller.

Figure 3D:
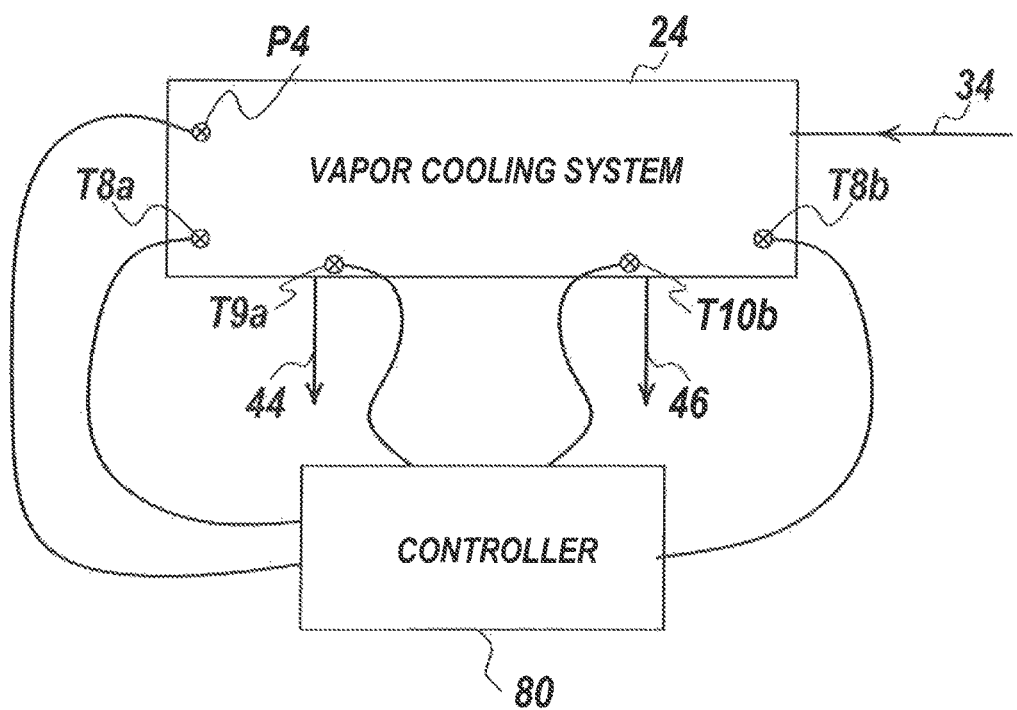

FIG. 3D shows a plurality of temperature sensors T8a and T8b for detecting temperature of the hydrocarbon liquid 44 and the gas 46 in the vapor cooling system 24. Each temperature sensor is electronically connected to the controller.

A ninth temperature sensor T9 detects hydrocarbon liquid temperature at an outlet of the vapor cooling system 24. The T9 temperature sensor is connected to the controller 80.

A tenth temperature sensor T10 detects gas temperature at an outlet of the vapor cooling system 24. The tenth temperature T10 sensor is connected to the controller.

A fourth pressure sensor P4 is depicted detecting pressure of vapor in the vapor cooling system. The fourth pressure sensor P4 is also connected to the controller.

Figure 4A:
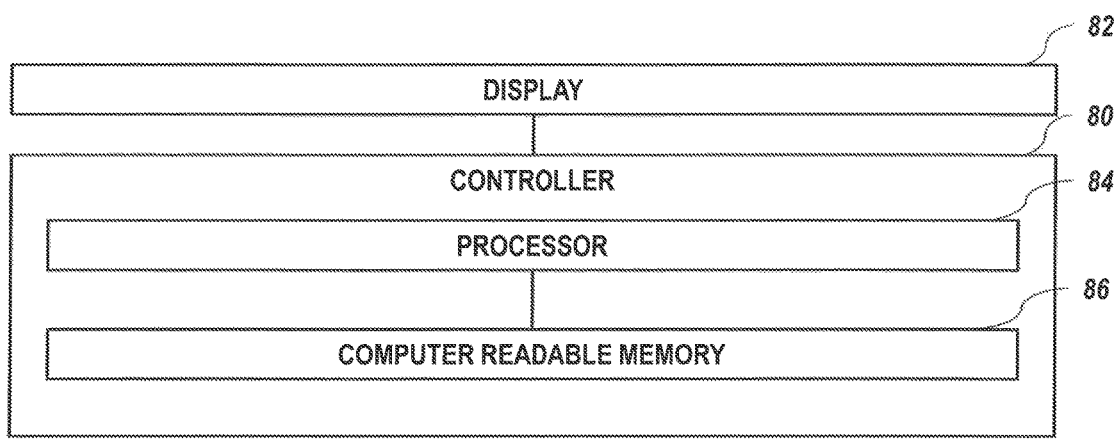
Figure 4B:
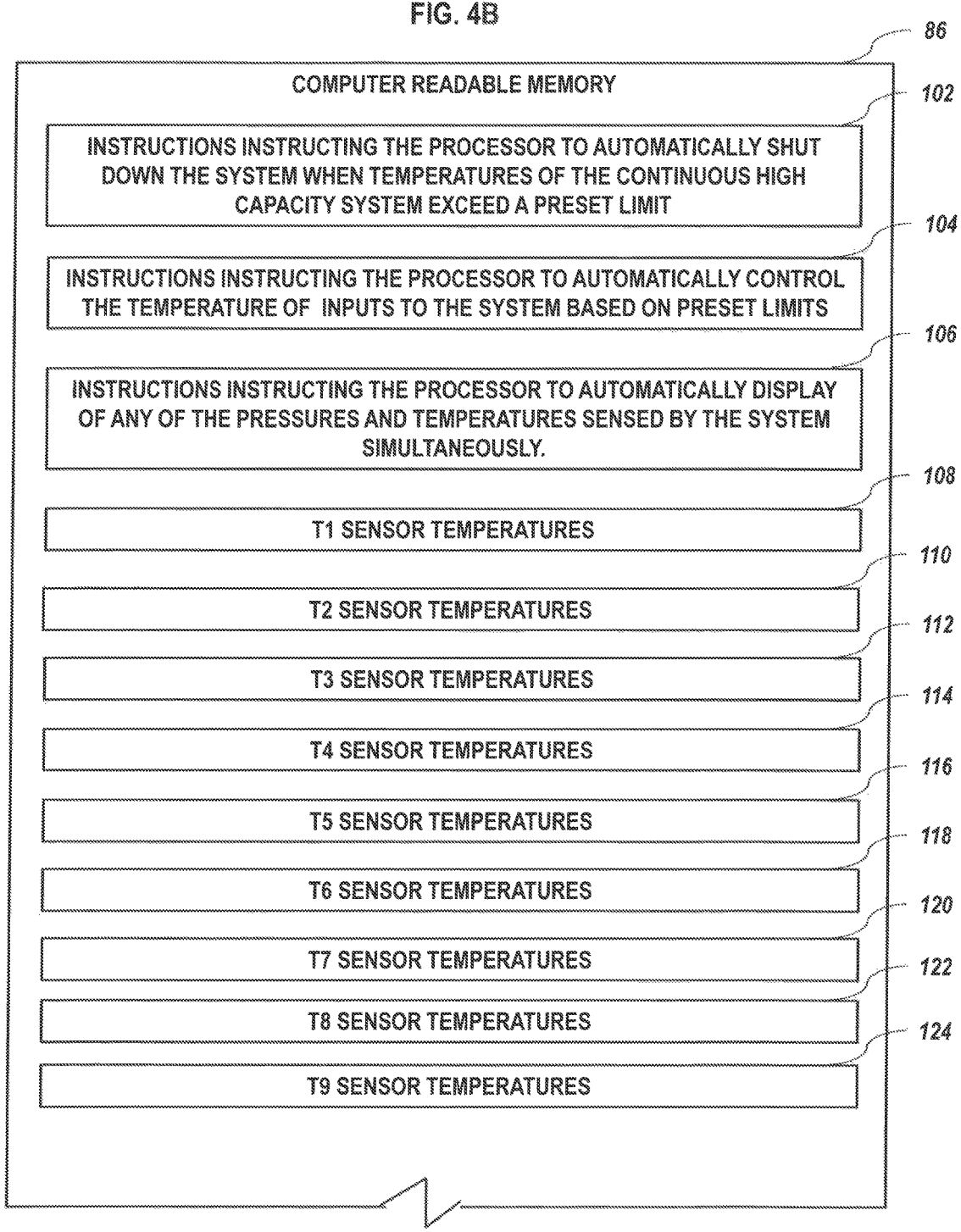

FIGS. 4A-4C shows an embodiment of a controller 80 for the system.

The controller 80 can be used to monitor any or all of the sensors of the continuous high capacity system.

The controller 80 is electronically connected to a display 82 which can be a wireless or wired connection. The display can be a monitor.

The controller 80 contains a processor 84 connected to a computer readable memory 86.

The processor can be a computer, a laptop, or a processing board.

FIG. 4B shows an example of the computer readable memory 86.

The computer readable memory 86 can contain instructions instructing the processor to automatically shut down the system when temperatures of the continuous high capacity system exceed a preset limit 102.

The computer readable memory 86 has instructions instructing the processor to automatically control the temperature of inputs to the system based on preset limits 104.

The computer readable memory 86 has instructions instructing the processor to automatically display of any of the pressures and temperatures sensed by the system simultaneously 106.

The computer readable memory includes T1 sensor temperatures 108, T2 sensor temperatures 110, T3 sensor temperatures 112, T4 sensor temperatures 114, T5 sensor temperatures 116, T6 sensor temperatures 118, T7 sensor temperatures 120, T8 sensor temperatures 122, T9 sensor temperatures 124, P1 sensor pressure 126, P2 sensor pressure 128, P3 sensor pressure 130, and P4 sensor pressure 132.

In various examples of the present disclosure, some values are provided as approximations. In one example, the term "approximately" signifies within one percent of the stated value. In another example, the term "approximately" signifies within five percent of the stated value. In another example, the term "approximately" signifies within ten percent of the stated value. In another example, the term "approximately" signifies within fifteen percent of the stated value. In another example, the term "approximately" signifies within twenty percent of the stated value.

Example 1

A continuous high capacity system for converting hydrocarbon-containing post-consumer waste, post-industrial waste, renewable hydrocarbon feedstock, and/or combinations thereof can produce approximately 8 gallons per hour of biodiesel in a continuous process.

A two-ton-per-hour pilot plant can produce approximately 3800 gallons per day of at least one biofuel, namely biodiesel, in this Example.

It is anticipated that the example system can feasibly scale up to a 50-tons-per-hour system.

Based on cow manure availability within 50 miles of the plant, it is expected to obtain approximately 20 tons per hour of dry cow manure The system includes: an extruder sized at 2 tons to 35 tons per hour of 100% renewable hydrocarbon feedstock which can pressurize within the heating system to the desired pressure of 2 psi.

The extruder can pressure the blend to a pressure of 200 psi within the extruder, agglomerating the blended stream into a continuous stream of agglomerated fine particulate at a flow rate of 670 pounds per minute.

The agglomeration and pressurizing of the blended stream within the extruder can prevent and/or reduce leakage of gases back to the extruder inlet.

The agglomerated blended stream flows at a rate of approximately 670 pounds per minute to a heating system fluidly connected to the extruder.

The heating system of this example has a screw conveyor that is 45 feet long and has a hollow rotating shaft of 42 inches in diameter with 28 screw conveyor flights are installed on the rotating shaft and with a outer housing 54 inches in diameter. The hollow shaft and the outer housing are made from 304 stainless steel.

The heating system rapidly heats the continuous stream of agglomerated fine particulate to a temperature in this Example of approximately 950 degrees Fahrenheit.

A separator made from 304 stainless steel is used to receive the heated solids and prevent the heated vapors from leaving the heating system via the separator.

In this example, a filter is a cyclone having a flow rate of approximately 45 cubic feet per second and is fluidly connected to the heating system. The cyclone is made of 304 stainless steel.

The filter receives the heated vapors and separates out microfine solids which can consist of char from the heated vapors forming a substantially cleaned vapor with only 0.1 micron of microfines in the vapor.

A vapor cooling system made up of stainless steel receives the substantially cleaned vapor at a flow rate of approximately 45 cubic feet per second at the entry vapor temperature of approximately 950 degrees Fahrenheit and outputs approximately 1600 gallons per hour at approximately 100 degrees Fahrenheit. Using pressure of approximately 1 psi and temperature of approximately 100 degrees Fahrenheit, the vapor cooling system reduces the temperature of the substantially cleaned vapor to a hydrocarbon liquid and a gas that are mostly approximately 100 degrees Fahrenheit.

The vapor cooling system liquefies at least 50 percent of the substantially cleaned vapor for transfer to a liquid fuel tank and the gas is conveyed to a gas fuel collection.

Example 2

In another example, a continuous high capacity system for converting hydrocarbon-containing post-consumer waste, post-industrial waste, renewable hydrocarbon feedstock and/or combinations thereof produces biofuel in a continuous process.

Figure 5:
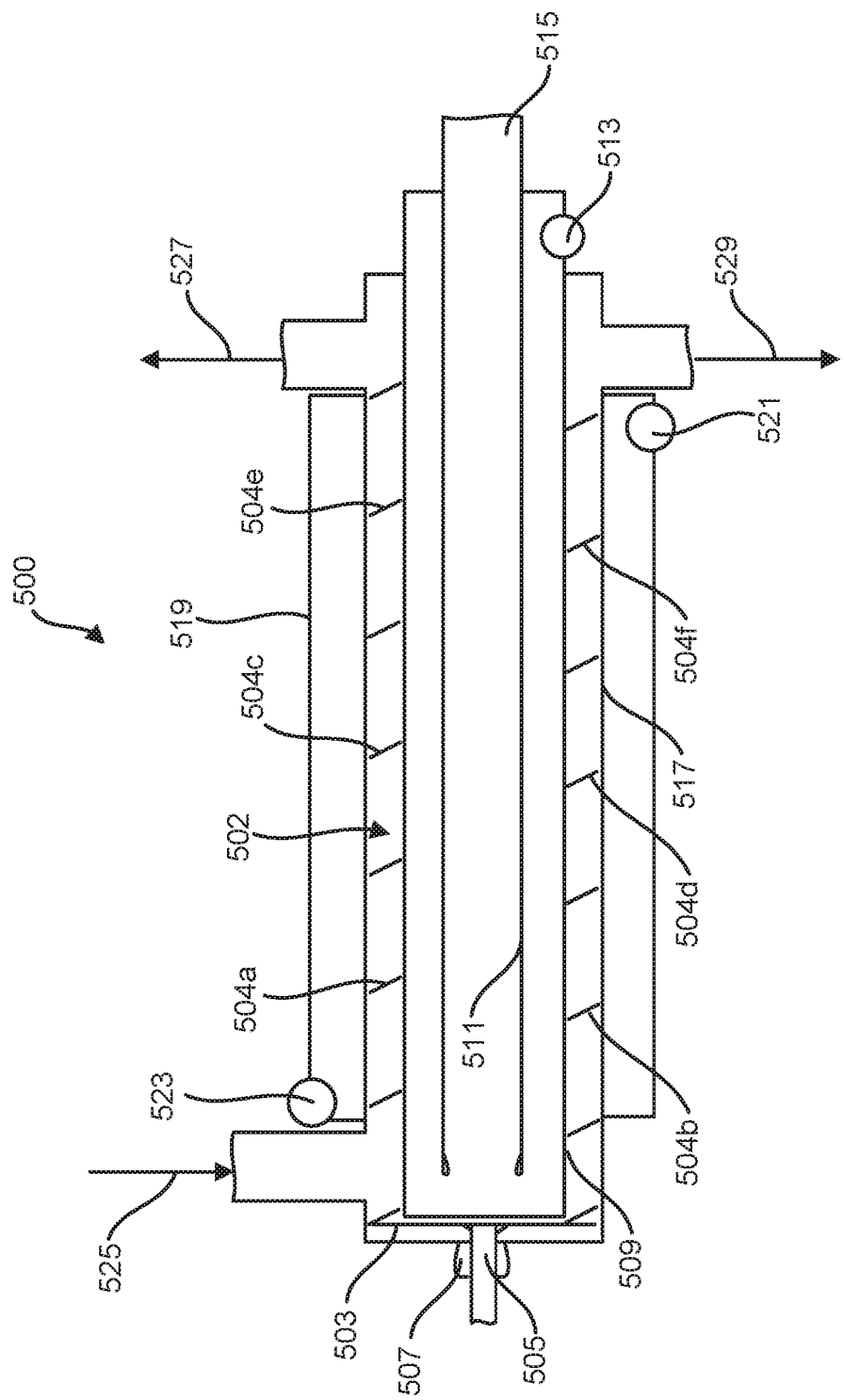
FIG. 5 shows a heating system as a shaftless conveyor with flights.

In this example, illustrated in FIG. 5, the system has a heating system 500 with a shaftless conveyor 502 comprising a plurality of shaftless conveyor flights 504a-504f jointly forming a helical structure.

In this embodiment, the shaftless conveyor 502 is driven by drive plate 503. Drive plate 503 is rotationally affixed to shaftless conveyor flights 504a-504f, such that rotation of drive plate 503 can drive shaftless conveyor flights 504a-504f to convey materials through heating system 500.

Drive plate 503 is driven by drive shaft 505, which is held and rotated within bearing and seal assembly 507. In this embodiment, bearing and seal assembly 507 are adapted to enable rotational movement of drive shaft 505 while preventing and/or mitigating contamination into rotating elements of drive shaft 505 and maintaining bearing lubrication within bearings of assembly 507.

Heating system 500 further comprises an annular inner housing 509 defining a center volume within shaftless conveyor flights 504a-504f. As depicted in FIG. 5, inner surfaces of shaftless conveyor flights 504a-504f abut outer surfaces of inner housing 509. Inner heating chamber 511 is contained within inner housing 509.

In embodiments, hot liquid and/or hot gas may be introduced into inner heating chamber 511 so that heat may be conducted via inner housing 509 to matter being conveyed by shaftless conveyor flights 504a-504f. Said hot liquid and/or hot gas may enter inner heating chamber 511 through inner heating chamber input 513 and exit through inner heating chamber exhaust 515.

Heating system 500 further comprises an annular outer housing 517 defining an annular volume around shaftless conveyor flights 504a-504f. As depicted in FIG. 5, outer surfaces of shaftless conveyor flights 504a-504f abut inner surfaces of outer housing 517. Outer heating chamber 519 contains outer housing 517.

In embodiments, hot liquid and/or hot gas may be introduced into outer heating chamber 519 so that heat may be conducted via outer housing 517 to matter being conveyed by shaftless conveyor flights 504a-504f. Said hot liquid and/or hot gas may enter outer heating chamber 519 through outer heating chamber input 521 and exit through outer heating chamber exhaust 523.

Feed material may be fed into heating system 500 via material feed port 525, after which said material can be conveyed through heating system 500 via shaftless conveyor flights 504a-504f while being heated from heat passed via inner housing 509 and outer housing 517. Heated vapor from feed material may exit heating system 500 via vapor exhaust port 527. Heated solid material may exit heating system 500 via solids exhaust port 529.

As may be understood by a person of ordinary skill in the art having the benefit of this disclosure, by heating material via both the inner housing and the outer housing, the system of the present example may provide the benefit of more rapid heating of said material compared to heating from solely an outer surface or solely an inner surface of a heating system. In the same vein, a heating operation carried out by heating material via both the inner housing and the outer housing may be accomplished in a relatively linearly shorter heating system compared to heating from solely an outer surface or solely an inner surface of a heating system.

While these embodiments have been described with emphasis on the embodiments, it should be understood that within the scope of the appended claims, the embodiments might be practiced other than as specifically described herein.

What is claimed is:

1. A system for converting biomatter into a bioproduct comprising:
   an extruder for extruding and pressurizing a blended stream containing post-consumer waste, post-industrial waste, and/or renewable hydrocarbon feedstock and agglomerating the blended stream into a continuous stream of agglomerated fine particulate;
   a heating system fluidly connected to the extruder evolving a heated vapor and heated solids from the blended stream, the heating system comprising a screw conveyor having a screw conveyor flight, wherein the heating system heats the continuous stream of agglomerated fine particulate to a temperature of approximately 500 to approximately 1500 degrees Fahrenheit;
   a separator for receiving the heated solids;
   a filter fluidly connected to the heating system for receiving the heated vapors and separating microfine solids from the heated vapors forming a substantially cleaned vapor; and
   a vapor cooling system receiving the substantially cleaned vapor and cooling the substantially cleaned vapor to a hydrocarbon liquid and a gas, the vapor cooling system liquefying at least 50 percent of the substantially cleaned vapor, wherein the gas is conveyed to a gas fuel collection.

2. The system of claim 1, further comprising:
   a sealing auger for receiving post-consumer waste, post-industrial waste, or renewable hydrocarbon feedstock forming a blended stream, wherein the sealing auger reduces leakage of ambient air into the system and a vacuum chamber fluidly connected to the sealing auger and a vacuum pump for removing air from the blended stream, thereby forming a de-aerated blended stream prior to passage of the de-aerated blended stream into the extruder.

3. The system of claim 1, further comprising: a shredder receiving the continuous stream of agglomerated fine particulate and forming shredded particulate.

4. The system of claim 1, wherein the filter is a cyclone for separating micro-fine solids from the heated vapors, thereby forming the substantially cleaned vapor.

5. The system of claim 1, wherein the screw conveyor moves agglomerated fine particulate while the conveyor housing is heated along its length by at least one external heat source, wherein the agglomerated fine particulate evolves heated vapor from heated solids.

6. The system of claim 1, further comprising a conveyor inner housing adapted to pass heat from the center of the screw conveyor to heat the continuous stream of agglomerated fine particulate.

7. The system of claim 1, further comprising a first temperature sensor at an inlet to the heating system to detect temperature of the continuous stream of agglomerated fine particulate, wherein the temperature sensor communicates with a controller.

8. The system of claim 1, further comprising:
a second temperature sensor to detect temperature outlet temperature of the heating system;
a plurality of third temperature sensors for detecting external heat source temperatures; and
a plurality of fourth temperature sensors for detecting temperature of a screw conveyor housing;
wherein each temperature sensor communicates with a controller.

9. The system of claim 1, further comprising:
a fifth temperature sensor for detecting temperature of the heated solids;
a sixth temperature sensor for detecting temperature of heated vapors; and
a seventh temperature sensor for detecting temperature of vapors in the filter;
wherein each temperature sensor communicates with a controller.

10. The system of claim 1, further comprising a plurality of eighth temperature sensors for detecting temperature in the vapor cooling system, wherein each temperature sensor communicates with a controller.

11. The system of claim 1, further comprising:
a ninth temperature sensor for detecting hydrocarbon liquid temperatures at an outlet of the vapor cooling system and
a tenth temperature sensor for detecting gas temperature at a gas outlet of the vapor cooling system;
wherein each temperature sensor communicates with a controller.

12. The system of claim 1, further comprising:
a first pressure sensor sensing vapor pressure at an input of the heating system
and a second pressure sensor sensing vapor pressure at an output of the heating system;
wherein each pressure sensor communicates with a controller.

13. The system of claim 1, further comprising:
a third pressure sensor detecting pressure of vapor in the filter and
a fourth pressure sensor detecting pressure of vapor in the vapor cooling system;
wherein each pressure sensor communicates with a controller.

14. The system of claim 1, further comprising a pressure regulator valve fluidly connected to a gas output from the vapor cooling system, wherein:
the pressure regulator valve controls pressure throughout the system and
the pressure regulator valve is electronically connected to a controller.

15. The system of claim 1, further comprising a controller for monitoring any sensors of the system, wherein:
the controller is connected to a display;
the controller comprises a processor with computer readable memory;
the computer readable memory comprises instructions for:
automatically shutting down when temperatures of the system exceed a preset limit;
automatically controlling temperature of inputs to the system based on preset limits and
automatically displaying, on the display pressures or temperatures sensed by the sensors of the system.

16. The system of claim 1, wherein the screw conveyor comprises a rotating shaft.

17. The system of claim 1, wherein the screw conveyor comprises a shaftless flight.

18. The system of claim 1, wherein the agglomeration and pressurizing of the blended stream by the extruder reduces leakage of gases back to an entrance of the extruder.

* * * * *